United States Patent
Israel et al.

(10) Patent No.: US 8,010,089 B2
(45) Date of Patent: Aug. 30, 2011

(54) SYSTEM AND METHOD OF PROVIDING IDENTITY CORRELATION FOR AN OVER THE TOP SERVICE IN A TELECOMMUNICATIONS NETWORK

(75) Inventors: Solomon Israel, Dallas, TX (US); Emmett Long, Dallas, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 292 days.

(21) Appl. No.: 12/487,452

(22) Filed: Jun. 18, 2009

(65) Prior Publication Data

US 2010/0184415 A1 Jul. 22, 2010

Related U.S. Application Data

(60) Provisional application No. 61/145,603, filed on Jan. 19, 2009.

(51) Int. Cl.
*H04Q 7/38* (2006.01)
(52) U.S. Cl. ............... 455/414.1; 455/414.2; 709/217; 709/225; 717/220; 701/211

(58) Field of Classification Search .............. None
See application file for complete search history.

(56) References Cited

U.S. PATENT DOCUMENTS

| 7,877,461 | B1* | 1/2011 | Rimmer | 709/217 |
| 2003/0037131 | A1 | 2/2003 | Verma | |
| 2003/0052165 | A1 | 3/2003 | Dodson | |
| 2006/0112172 | A1 | 5/2006 | Isaac et al. | |
| 2007/0077921 | A1* | 4/2007 | Hayashi et al. | 455/414.1 |

FOREIGN PATENT DOCUMENTS

WO  WO 02/27516 A1  4/2002

* cited by examiner

*Primary Examiner* — Phuoc Doan

(57) ABSTRACT

A system, method and node of providing identity correlation for an Over The Top (OTT) service in a telecommunications network. The method includes the steps of providing user information to a database associated with the OTT service and sending an identification cookie to a User Equipment (UE) of the user. The UE may then request access to a web site. The identification cookie within the UE is read and correlated with the user information stored in the database. Data from the web site is then presented to the UE based on the user information.

27 Claims, 4 Drawing Sheets

SYSTEM AND METHOD OF PROVIDING IDENTITY CORRELATION FOR AN OVER THE TOP SERVICE IN A TELECOMMUNICATIONS NETWORK

CROSS-REFERENCE TO RELATED APPLICATIONS

This application claims the benefit of U.S. Provisional Application No. 61/145,603, filed Jan. 19, 2009, the disclosure of which is incorporated herein by reference.

BACKGROUND

The following abbreviations are defined below as used in the remainder of the application:

AAA—A radius Authentication Authorization and Accounting server used in telecom networks as specified by RFC 2865.

ASP—Application Service Provider. Is a business that provides applications or content and media over the internet via http protocol. The ASP does not maintain the physical connectivity or broadband pipe to the end user. Examples of ASPs are Turner Broadcasting, Google, MSNBC.

ISP—Internet Service Provider provides the physical broadband connection used for delivering services. Examples of these include AT&T, Comcast, Earthlink, etc.

IPX—Internet Payment Exchange and Message Gateway. This element is responsible for the delivery of the message that carries the cookie/link to the telcom carrier network. IPX, a Telefonaktobolagit Ericsson acronym, is also known as Extended SMS Service system and typically has connectivity to many (over 100) telecom networks at a time.

Http—Hyper Text Transfer Protocol.

MSP—Multi Service Proxy—This element performs a gateway function enabling the policing of traffic at the edge of the network.

SAML—Security Assertion Markup Language

OTT—Over the Top, digital industry term describing third party services that are delivered across (i.e., "on top" of) a broadband network without affiliation with the broadband service provider WAP—Wireless Application Protocol.

The present invention relates to communications networks. More particularly, and not by way of limitation, the present invention is directed to a system and method of providing identity correlation for an over the top service in a telecommunications network. Many service providers, such as media companies, content companies, and Application Service Providers (ASPs) have a need to be able to uniquely identify the users of their service for the purposes of opting into advertising, premium content, follow-up information delivered to the user, audience data monetization, and n-screens distribution (common data and personalization across different access types). In addition, compliance to legal privacy requirements often requires a unique correlation of the online presence to the physical individual. Furthermore, companies often desire to provide a single experience for consumers of their services across multiple access domains (i.e., over wireless and wireline modes of transmission).

Currently, content/media companies and ASPs (companies that do not provide the actual data connectivity) are required to either have agreements with individual Internet Service Providers (ISPs) and/or telecom operators to provide this information or require each user session to be uniquely "logged into". For example, current systems utilize a Security Assertion Markup Language (SAML) which is an Extensible Markup Language (XML)-based standard for exchanging authentication and authorization data between security domains. In particular, data is exchanged between an identity provider (a producer of assertions) and a service provider (a consumer of assertions). SAML is a product of the OASIS Security Services Technical Committee.

However, current systems suffer several disadvantages in the mobile domain. One existing system for extending the solution to the mobile space includes requiring a user to login with a unique identifier each time a session is initiated. In the case of many feature phones (e.g., those lacking QWERTY keyboards and large format displays), this is extremely inconvenient as the user must use a multi-tap key stroke per letter or an additional application such as T9™. It is known that 50% of the users drop off a page click where a login is required. This obviously has a very negative impact on usage of a service and its financial value to an application service provider.

In an alternate solution for use with thin clients is the utilization of downloads to the mobile device. However, this solution suffers from several disadvantages. First, this solution requires a download of a unique client. The solution requires the development of unique clients for each class of device (if not per device). Additionally, technical support of the client over time is challenging. The number of handsets may be limited to those that are specifically tested.

In an alternate solution, an ASP may establish business relationships with an ISP to provide the requisite customer information. This would require the ASP to establish and maintain unique business relationships with a significant number of ISPs. For example, a global media company would likely require over 350 business relationships with telecom operators around the world.

SUMMARY

The present invention enables a user to opt into an Over The Top (OTT) service through multiple access domains. The present invention identifies the user and correlates the user's activities across these multiple access domains. Initially, a user registers via any communication device for the OTT service. A cookie or link is sent to a User Equipment (UE) associated with the user. When the user accesses the web site/service through the UE, the cookie uniquely identifies the device. The cookie is cross referenced with the specific individual registered user. Data from the OTT service is then provided to the user.

In one aspect, the present invention is directed at a method of providing identity correlation for an OTT service in a telecommunications network. The method includes the steps of providing user information to a database associated with the OTT service and sending an identification cookie to a UE of the user. The UE may then request access to the OTT service. The identification cookie within the UE is read and correlated with the user information stored in the database. Data from the OTT service is then presented to the UE based on the user information.

In another aspect, the present invention is directed at a system for providing identity correlation for an OTT service in a telecommunications network. The system includes a computer for providing user information to a database associated with the OTT service and a UE of the user operating in the telecommunications network. A messaging gateway sends an identification cookie to the UE. The identification cookie is associated with the OTT service and used to identify the user. The UE requests access through the UE for the OTT service with the identification cookie. The system also includes an application server associated with the OTT service for correlating the identification cookie of the UE with the user information stored in the database. The data of the OTT service is then presented to the UE based on the user information.

In still another aspect, the present invention is directed at a node for providing identity correlation for an OTT service in a telecommunications network. The node receives user information of a user for the OTT service and sends an identification cookie to a UE of the user operating in the telecommunications network. The identification cookie is associated with the OTT service. When the UE requests access through the UE for the OTT service with the identification cookie, the node correlates the identification cookie of the UE with the user information stored in the database and presents data of the OTT service to the UE based on the user information.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
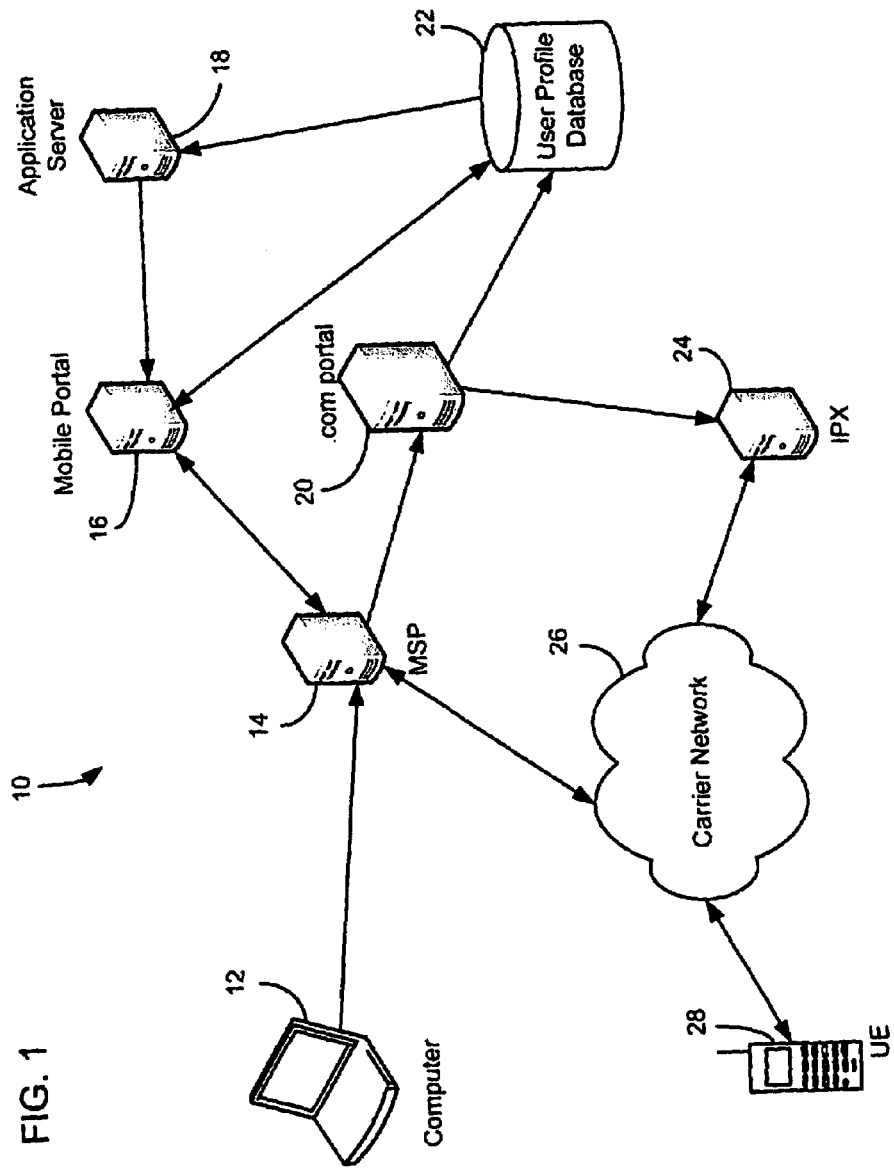
FIG. 1 is a simplified block diagram of an OTT Identity correlation system in a preferred embodiment of the present invention.

The present invention is a system and method of providing identity correlation for an Over The Top (OTT) service in a telecommunications network. FIG. 1 is a simplified block diagram of an OTT Identity correlation system 10 in the preferred embodiment of the present invention. The system includes a computer 12, a Multi-Service Proxy (MSP) 14, a mobile portal 16, an application server 18, a ".com" portal 20, a user profile database 22, an Internet Payment Exchange and Message Gateway (IPX) 24, a carrier network 26, and user equipment (UE) 28.

OTT service is a term used to describe third party services that are delivered across (i.e., "on top" of) a broadband network without affiliation to the broadband service provider. The computer 12 is any computing device, such as a personal computer (PC). The MSP 14 performs a gateway function enabling the policing of traffic at an edge of the network, e.g., carrier network 26. The IPX 24 is a gateway responsible for delivery of a message that carriers a cookie/link to the carrier network 26. Typically, the IPX has connectivity to many networks simultaneously. The .com portal 20 is any web portal, such as a news media, or content, provider. The mobile portal 16 is a mobile variant of the .com portal 20. It should be understood that the present invention may use other types of nodes and portal gateways and still remain in the scope of the present invention.

The present invention enables a user to opt into an OTT service, thereby allowing the user access to premium services via a mobile device, such as the UE 28. The system 10 identifies the user and correlates the user's activities across multiple access domains (i.e., wireless and wireline domains). A user initially registers via the computer or other communication device for the OTT service. In addition, the user registers the UE (e.g., mobile device). The system pushes a cookie or Uniform Resource Locator (URL) link to the registered UE. When the user accesses the web site/service from the UE, the cookie uniquely identifies the device. The application service (application server 18) can cross reference or correlate the cookie with the specific individual registered user.

Figure 2:
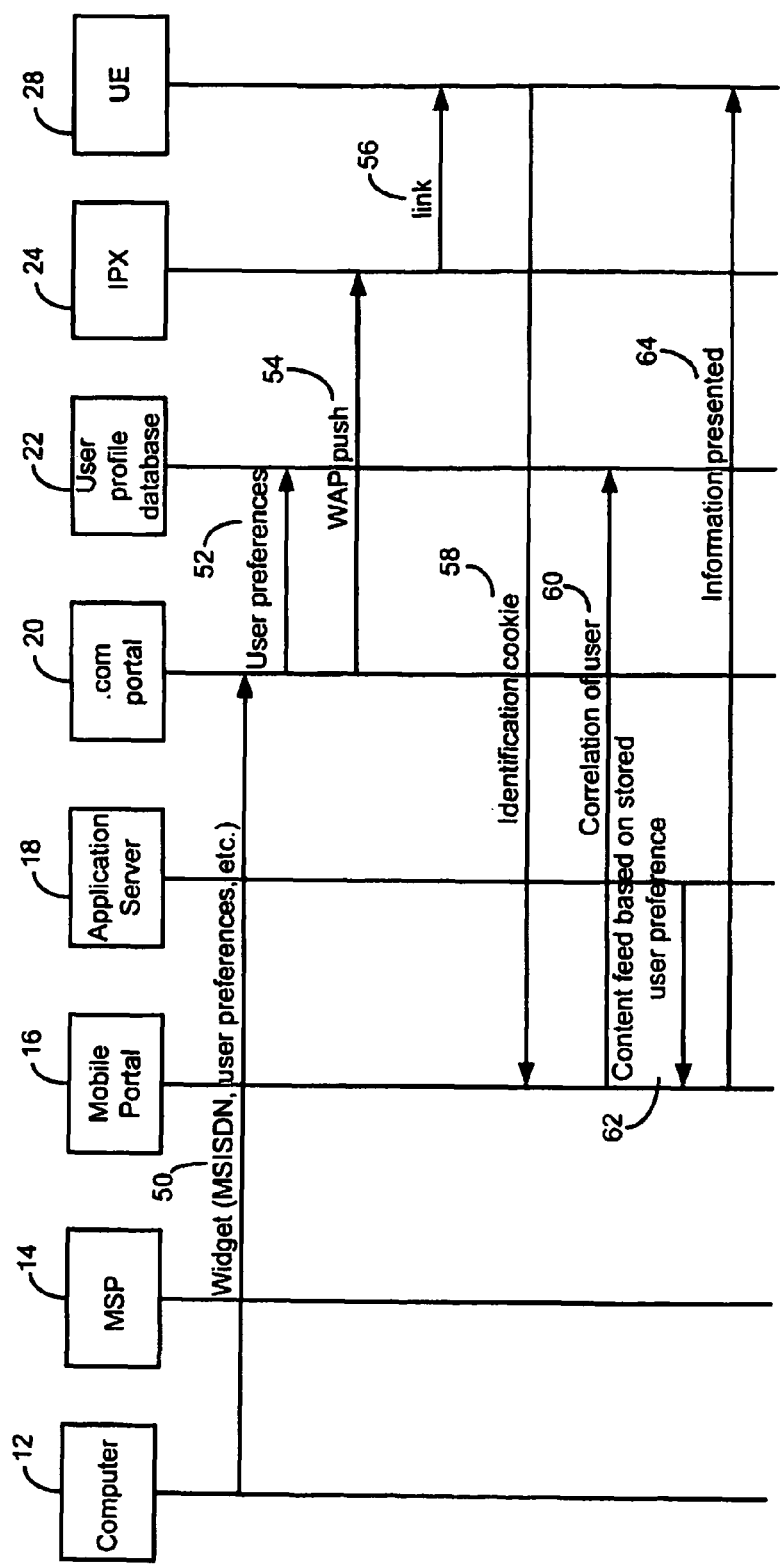
FIG. 2 is a signaling diagram illustrating a call flow of the present invention.

FIG. 2 is a signaling diagram illustrating a call flow of the present invention. The user accesses, via the computer 12, the .com portal 20 and provides the .com portal with a widget at 50. The call flow should be read with reference to FIG. 1. The widget contains information on the user and may include generalized preferences for web access via the UE 28. Additionally, the widget preferably provides a Mobile Subscriber Integrated Services Digital Network Number (MSISDN) associated with the UE. Next, the preferences are sent and stored in the user profile database 22 at 52. The .com portal 20 then triggers a Wireless Application Protocol (WAP) push to the UE 28 via the IPX 24 at 54. At 56, the IPX 24 sends a link to the UE 28 via the carrier network 26. The link contains a web or WAP page that loads an identification cookie within the UE. As desired by the user, the user selects the received link on the UE, which loads the identification cookie onto the UE. When the user selects a mobile website at 58 through the UE 28, the cookie is read by the mobile portal 16. Next, the mobile portal 16 queries the user profile database 22 and correlates the cookie to the preferences of the user at 60. Based on the established identity and the business logic of the application server 18, the content feeds, advertising preferences, and other information are tailored in accordance with the user's preferences at 62. Next, the information is presented to the UE 28 at 64.

Figure 3A:
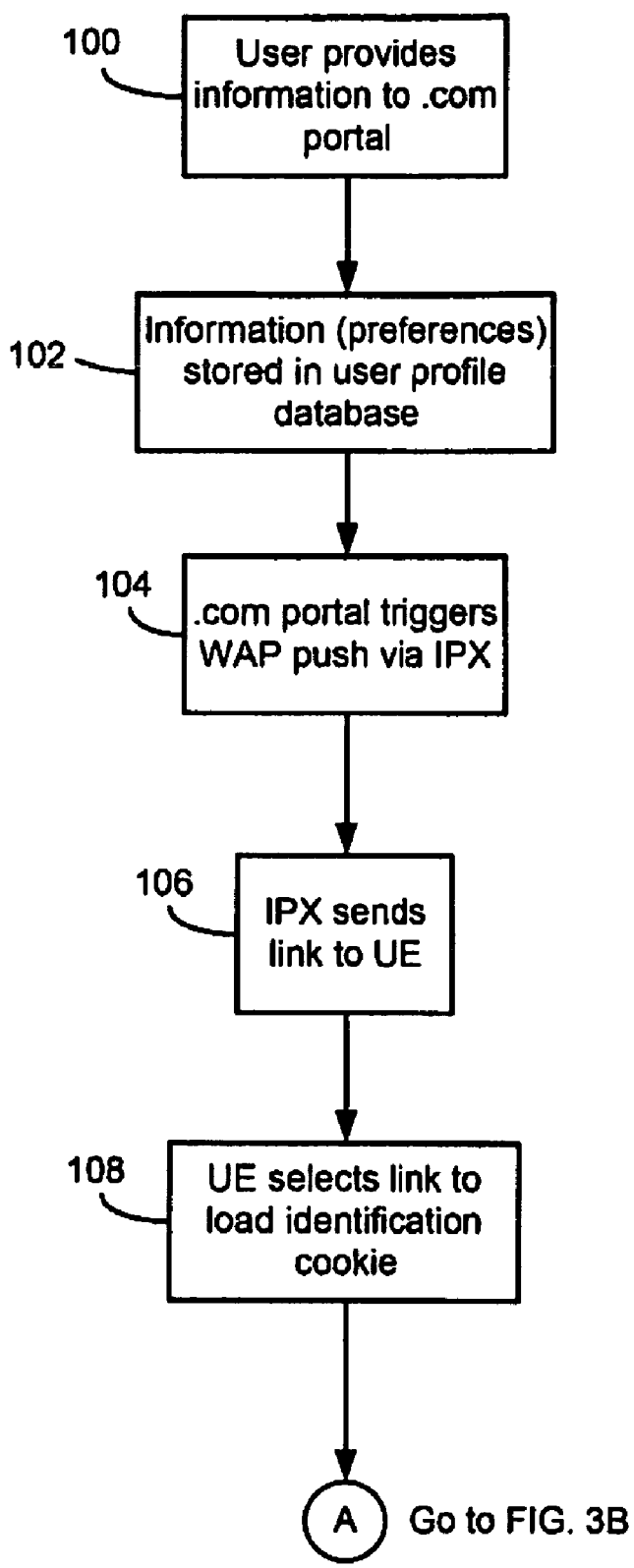
FIGS. 3A and 3B are flowcharts illustrating the method of providing identity correlation for an OTT service in a telecommunications network in accordance with the present invention.
Figure 3B:
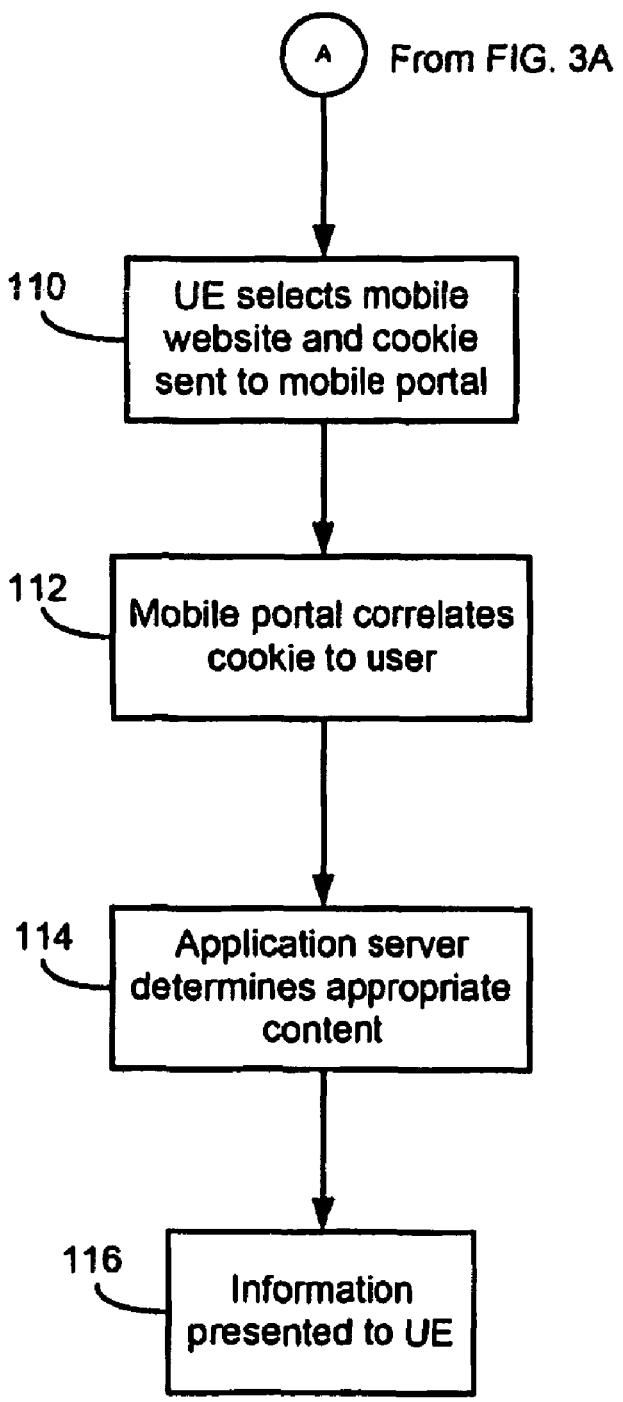

FIGS. 3A and 3B are flowcharts illustrating the method of providing identity correlation for an OTT service in a telecommunications network. With reference to FIGS. 1-3, the steps of the method will now be explained. The method begins in step 100 where the user accesses, via the computer 12, the .com portal 20 and provides the .com portal 20 with a widget (not shown) containing information on the user. The information may include preferences for web access via the UE 28. Additionally, the widget preferably provides a MSISDN associated with the UE. Next, in step 102, the preferences are sent and stored in the user profile database 22. In step 104, the .com portal 20 also triggers a Wireless Application Protocol (WAP) push to the UE 28 via the IPX 24. In turn, the IPX 24 sends a link to the UE 28 via the carrier network 26 at step 106. The link contains a web or WAP page that loads an identification cookie within the UE. In step 108, when desired by the user, the user selects the received link on the UE, which loads the identification cookie onto the UE. In step 110, when the user selects a mobile website through the UE 28, the cookie is sent and read by the mobile portal 16. Next, in step 112, the mobile portal 16 queries the user profile database 22 and correlates the cookie to the preferences of the user. Based on the established identity and the business logic of the application server 18, the content feeds, advertising preferences, and other information are tailored in accordance with the user's preferences at step 114. Next, in step 116, the information is presented to the UE 28.

The present invention provides several advantages over existing systems. Existing systems are premised on the service provider (i.e., telecom operator) as providing the identity correlation function via network elements such as an Authentication Authorization and Accounting (AAA) server or Hyper Text Transfer Protocol (http) header. In this existing system, the telecom operator must provide or expose an interface to provide this information. In addition, the application/content and the media provider must enter into a unique business arrangement with each service provider. This existing system obviates the need for the telecom operator to expose this interface and for the content and media company to enter into literally hundreds of such relationships in order to achieve a large geographic exposure. The present invention does not require the use of these businesses relationships. In the present invention, preferences are consolidated for both ".com" (conventional websites) and their mobile variants. This enables a common user experience across multiple access methods. This is referred to as a common multi-screen experience. In addition, in the present invention, preferences are consolidated for both conventional web access and their mobile variants. This permits the information, subject to user privacy agreements, to be used for targeted advertising to the user. Additionally, the correlation of user preferences and usage facilitates data mining, thereby enabling a media company to set appropriate "click through rates".

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. A method of providing a user access to a website via a telecommunications network, the method comprising the steps of:
   the user accessing a third party server comprising an Over The Top (OTT) service, the third party server being connected to the telecommunications network;
   providing user information to the OTT service, the information being stored in a database accessible only by the OTT service;
   registering a mobile user equipment (UE) with the OTT;
   pushing an identification cookie associated with the stored information or a Universal Resource Locator (URL) link to the user's UE;
   the user subsequently requesting access via the UE to the web site;
   correlating the identification cookie of the UE with the stored user information;
   customizing website content according to the user information stored in the database; and
   presenting the website content to the UE.

2. The method according to claim 1 wherein the user information includes user preferences of media or content provider preferences.

3. The method according to claim 1 wherein the user information includes the UE identification information.

4. The method according to claim 3 wherein the UE information includes a Mobile Subscriber Integrated Services Digital Network Number (MSISDN) of the UE.

5. The method according to claim 1 wherein the user information includes user preference information for use across a plurality of access domains.

6. The method according to claim 1, further comprising the step of correlating the user information and the user's usage information for enabling data mining of the stored user information.

7. The method according to claim 1 wherein the step of sending an identification cookie further comprises:
   sending a Uniform Resource Locator (URL) link to the UE, the URL link providing a web page for loading the identification cookie into the UE; and
   the user selecting the URL link for automatically loading the identification cookie to the UE.

8. The method according to claim 1 wherein the step of sending an identification cookie includes sending the identification cookie to the UE through a messaging gateway via a carrier network of the UE.

9. The method according to claim 1 wherein the step of requesting access includes providing access to the identification cookie within the UE.

10. The method according to claim 9, further comprising the step of
    querying the database with the identification cookie to obtain the user information.

11. The method according to claim 1 wherein the UE is a mobile station accessing the web site via a mobile portal.

12. The method according to claim 1 wherein the OTT service is a mobile accessible service.

13. A system for providing a user access to a web site via a telecommunications network, the system comprising:
    a computer for
       accessing a third party server comprising an Over The TOP (OTT) service that is connected to the network;
       providing user information to the OTT service, the OTT associating an identification cookie with the user information;
       storing the user information in a database accessible only by the OTT service; and
       registering a mobile User Equipment (UE) of the user with the OTT service;
    a web site for providing content to the UE, the web site having means for adapting the content according to the user information in the database;
    a messaging gateway for pushing the identification cookie, or a Universal Resource Locator, to the UE the UE utilizing the identification cookie to request access to the web site; and
    an application stored in the third party for correlating the identification cookie of the UE with the user information stored in the database.

14. The system according to claim 13 wherein the user information includes media or content preferences of the user.

15. The system according to claim 13 wherein the user information includes UE identification information.

16. The system according to claim 15 wherein the UE identification information includes a Mobile Subscriber Integrated Services Digital Network Number (MSISDN) of the UE.

17. The system according to claim 13 wherein the user information includes user preference information for use across a plurality of access domains.

18. The system according to claim 13 wherein the messaging gateway includes means for sending the Uniform Resource Locator (URL) link to the UE, the URL link providing a web page for automatically loading the identification cookie into the UE.

19. The system according to claim 18 wherein the UE includes means for selecting the URL link for loading the identification cookie in the UE.

20. The system according to claim 13 wherein the OTT service includes means for querying the database utilizing the identification cookie to obtain the user information.

21. The system according to claim 13 wherein the OTT service is a mobile accessible service.

22. A node for providing a user access to a web site via a telecommunications network, the node comprising:
- a third party server comprising an Over The TOP (OTT) service for storing and providing user information;
- an access means for receiving information from the user, including the user's User Equipment (UE) registration, the information being stored in a database accessible only by the OTT service;
- transmission means for sending an identification cookie, associated with the user information, or a Universal Resource Locator (URL) to the user;
- correlation means in the server for correlating the identification cookie of the UE with the user information stored in the database;
- means for sending the correlating results to a requesting web site; and
- receiving means for receiving the identification cookie from a web site.

23. The node according to claim 22 wherein the user information includes user preferences regarding content available to the user.

24. The node according to claim 22 wherein the user information includes UE identification information.

25. The node according to claim 24 wherein the UE information includes a Mobile Subscriber Integrated Services Digital Network Number (MSISDN) of the UE.

26. The node according to claim 22 wherein the user information includes user preference information for use across a plurality of access domains.

27. The node according to claim 22, the URL link providing a web page for automatically loading the identification cookie into the UE.

* * * * *